United States Patent [19]

Bond

[11] 4,328,427
[45] May 4, 1982

[54] SMOOTH SERIES PARALLEL TRANSITION FOR DUAL WINDING TRACTION ALTERNATOR

[75] Inventor: Paul A. Bond, Erie, Pa.

[73] Assignee: General Electric Company, Erie, Pa.

[21] Appl. No.: 166,622

[22] Filed: Jul. 7, 1980

[51] Int. Cl.³ .............................................. B60L 11/06
[52] U.S. Cl. .......................................... 290/3; 290/6
[58] Field of Search ................. 290/3, 6, 45; 318/149, 318/156

[56] References Cited

U.S. PATENT DOCUMENTS 2,261,701  11/1941  Steinbauer et al. ...................... 290/3
2,292,843  8/1942  Perry et al. ........................... 290/6 X
2,292,844  8/1942  Perry et al. ........................... 290/6 X

FOREIGN PATENT DOCUMENTS 1051588  12/1966  United Kingdom ................. 318/149
718309   2/1980   U.S.S.R. ..................................... 290/3

*Primary Examiner*—Gene Z. Rubinson
*Assistant Examiner*—W. E. Duncanson, Jr.
*Attorney, Agent, or Firm*—Albert S. Richardson, Jr.

[57] ABSTRACT

An engine-driven dual winding separately excited alternator supplies electric power to a parallel array of d-c traction motors via a power rectifier assembly comprising three legs of serially interconnected diodes. The alternator has a first set of 3-phase windings respectively connected to the three rectifier legs at points between first and second diodes thereof and another set of duplicate windings respectively connected to the corresponding legs at points between third and fourth diodes thereof. First and second switching means are used to interconnect the respective junctures of the second and third diodes of all three rectifier legs, and in response to transition command signals these switching means are selectively closed (or opened) in sequence to change the connection of the alternator windings from parallel to series (or vice versa). Stabilizing means associated with the excitation system of the alternator is temporarily disabled during the transition interval.

12 Claims, 6 Drawing Figures

SMOOTH SERIES PARALLEL TRANSITION FOR DUAL WINDING TRACTION ALTERNATOR

CROSS REFERENCE TO RELATED APPLICATION

Certain features of the illustrated embodiments of this invention are the claimed subject matter of copending patent application Ser. No. 166,680 filed concurrently herewith the L. W. McSparran and R. M. Smith and assigned to the General Electric Company.

BACKGROUND OF THE INVENTION

This invention relates generally to a multiwinding electric power supply system wherein separate windings of the supply can be alternatively connected in either series or parallel circuit relationship, and it relates more particularly to means for smoothly accomplishing the series-parallel transitioning of a dual winding traction alternator that supplies power to an electrical propulsion system for a traction vehicle.

Propulsion systems for traction vehicles such as locomotives commonly use a diesel engine prime mover to drive electric generating means for supplying energy to a plurality of pairs of direct current (d-c) traction motors. The generating means typically comprises a 3-phase traction alternator whose alternating voltage output is rectified and applied to relatively positive and negative d-c buses between which the respective pairs of motors are connected in parallel. The output power of the alternator is regulated or varied by suitably controlling the strength of its field excitation and the rotational speed of the engine. For maximum efficiency the controls of the propulsion system are suitably designed to work the engine on its full horsepower curve throughout a wide speed range of the locomotive.

In order to accelerate a locomotive from rest, the alternator must supply maximum current to the traction motors so that they can provide high tractive force or effort, but at low speed the output voltage of the alternator can be relatively low because the counter emf of each motor is a function of locomotive speed. When relatively high speed operation of the locomotive is desired, the alternator must apply maximum voltage to the traction motors to overcome their high counter emf, but the alternator output current can now be relatively low because the motors draw less current at high speed than at low speed. To accommodate both of these extremes without reducing the useful horsepower of the engine and without requiring an unreasonably large or expensive alternator, it has heretofore been common practice to provide speed responsive means for transitioning between parallel and series the circuits that interconnect the two motors forming each pair of traction motors in the propulsion system. At low speeds, when high current but low voltage is required, the motors in each pair are interconnected in series with one another, whereas at high speeds, when high voltage but low current is required, all of the motors are configured in a parallel mode. The change of modes is accomplished by means of suitable contactors in the motor circuits, which contactors are actuated automatically in response to the sensed speed of the locomotive traversing a predetermined critical speed between high and low speed ranges.

When an accelerating locomotive attains the aforesaid critical speed that initiates a transition of each pair of traction motors from series mode to parallel mode, all of the motors are temporarily disconnected from the d-c bus (to avoid undesirable short circuits) before they are reconnected in parallel. However, before this switching sequence begins the alternator field excitation level is reduced so that the output voltage of the alternator will be very low or zero when the series contactors are opened. If the output voltage were not lowered in this manner, it would be near its maximum value at the transition speed of the locomotive with each pair of motors still connected in series, and the series contactors might flash over when opened. Once the voltage has been lowered and the series contactors have been safely opened, and after the parallel contactors are subsequently closed, excitation is restored to the proper level for increasing the alternator output voltage to a new value which is approximately one-half of its value just before the locomotive attains the transition speed. The time required to complete this prior art series-to-parallel motor transition sequence, including the time to restore power to its desired level, has typically been appreciably longer than ten seconds. This method is accompanied by undesired loss in acceleration and tractive effort.

In the prior art arrangement summarized above, when the paired motors are connected in the series mode, a problem can arise if one of the locomotive axle-wheel sets loses adhesion and begins to slip on the rails. The particular traction motor that is coupled to the slipping wheel set will accelerate faster than the other motors, and this condition, if uncorrected, could result in rail grinding, wheel spalling, and motor overspeed. During the wheel slip condition the affected motor experiences increasing counter emf and decreasing current. The second motor with which the affected motor is serially paired will accordingly suffer the same decrease in current, and its voltage will decrease by an amount equal to the increase in voltage of the slipping motor. As a result neither motor can use the energy intended for it, and since the system regulates constant horsepower, power will shift to the non-slipping wheel sets, increasing their tendency to slip.

If all of the motors could be connected in parallel during low speed, high tractive effort operation of the locomotive, the effect of a slipping wheel set on the others would be less severe. That is, if a wheel slip occurs, the acceleration above rail speed can no longer be as drastic as in the series configuration because the voltage of the affected motor is clamped to the bus of the other motors. Also the shift in power out of the slipping motor will be absorbed by more motors than before, reducing the tendency to precipitate slips of other wheel sets. The parallel configuration, then, has inherent advantages in the control of wheel slips, and the net useable adhesion can be materially improved.

In order to keep the traction motors permanently in parallel, it has been previously proposed to utilize a dual winding alternator having two sets of 3-phase armature windings that can be connected either in parallel (for low speed, high current operation) or in series (for high speed, high voltage operation). See German Pat. No. 2,254,937, U.S. Pat. No. Re. 23,314, and U.S. Pat. Nos. 3,984,750 and 4,009,431. All of these known prior art approaches have involved providing individual rectifying bridges or units for each set of alternator windings and selectively switching the d-c outputs of the respective rectifier units between series and parallel connections in response to the transition-initiating event.

In the cross-referenced copending patent application Ser. No. 166,680 an improved series-parallel transition circuit for a dual winding alternator is disclosed and claimed. The improved circuit includes a special rectifier assembly comprising three parallel legs of at least four serially interconnected diodes each. The three windings of one set of alternator windings are respectively connected to points between first and second diodes in the three rectifier legs, whereas the respectively in-phase windings of the other set are correspondingly connected to points between third and fourth diodes in the same three legs. First and second switching means are respectively connected between the junctures of the second and third diodes in one rectifier leg and the corresponding junctures of the second and third diodes in the other two legs. The two sets of alternator windings are effectively connected in a parallel mode whenever the first and second switching means are open, and they can be reconnected in a series mode simply by actuating both switching means to closed circuit states.

SUMMARY OF THE INVENTION

A general objective of the present invention is to provide control means for a traction vehicle propulsion system incorporating the improved series-parallel transition of the above-cited application Ser. No. 166,680, which control means enables the transition process to be carried out very smoothly and without adversely disturbing the engine load or the supply of electric power to the traction motors.

Another object of the invention is to control such a propulsion system in a manner that makes the series-parallel transition of its power supply smoother and faster than the prior art series-parallel transition of traction motors.

In carrying out the invention in one form, a plurality of d-c traction motors are connected in parallel with one another between a pair of d-c buses of a traction vehicle propulsion system. A dual winding alternator having a field winding and two sets of three-phase alternating current armature windings is connected to the d-c buses by way of the above-summarized special rectifier assembly, including first and second switching means. The two sets of alternator windings are effectively connected in parallel between the d-c buses so long as the first and second switching means are open, whereas they are connected in series between the buses when both switching means are closed. Thus the alternator windings are transitioned from parallel to series modes by closing the switching means. This action is commanded by an "up" transition signal, and preferably it is not initiated until after the alternator field excitation has been reduced below a normal level so as correspondingly to reduce the alternator output voltage. Later, to transition the alternator windings from series to parallel modes, both switching means are opened in response to a "down" transition command signal.

In one aspect of the invention, means for actuating the first and second switching means between their open and closed circuit states is operative in response to the up transition command signal to cause the two switching means to close in sequence, and subsequently the actuating means is operative in response to a down transition command signal to cause the same switching means to open in sequence. In another aspect of the invention stabilizing means that normally limits the rate of change of alternator field excitation is disabled during the up and down transition intervals. As a result, each transition is accompanied by a series of relatively small step changes in the alternator output power, and lurching of the vehicle is avoided. The whole transition process is completed smoothly and quickly (e.g. in less than one second) without adversely stressing the vehicle couplers and without causing smoke in the engine exhaust.

The invention will be better understood and its various objects and advantages will be more fully appreciated from the following description taken in conjunction with the accompanying drawings.

DESCRIPTION OF THE PREFERRED EMBODIMENTS

Figure 1:
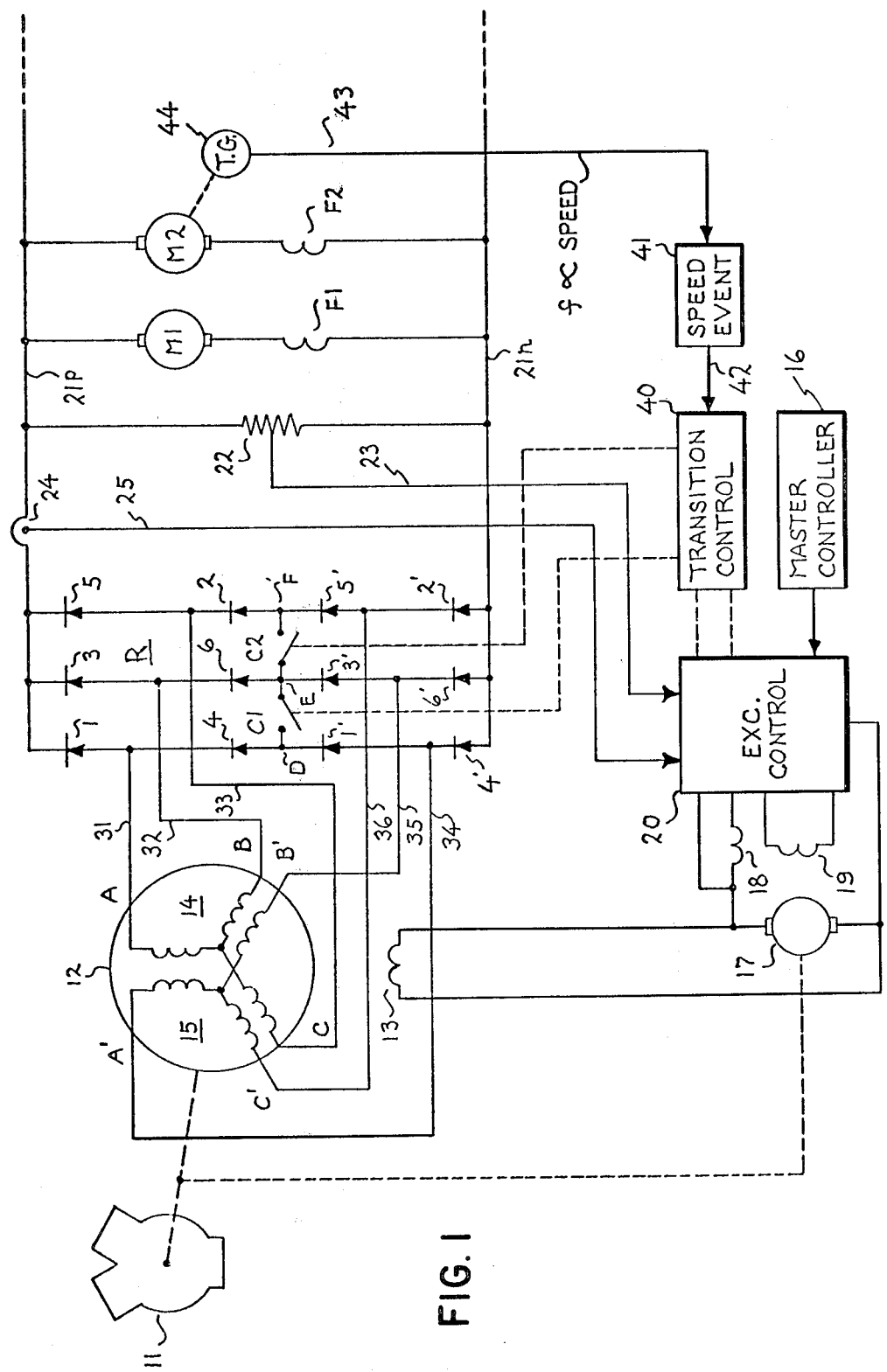
FIG. 1 is a functional block diagram of an electric propulsion system for a traction vehicle, which system includes a dual winding alternator and means for transitioning the alternator windings between series and parallel modes.

Referring now to FIG. 1, there is shown in schematic diagram of the invention as applied to a propulsion system for a self-propelled traction vehicle such as a diesel-electric locomotive. In the illustrated system a prime mover 11 comprising a diesel engine is mechanically coupled to the rotor of a dynamo-electric machine 1 comprising a dual winding traction alternator. The engine 11 is supercharged by a turbocharger (not shown). The alternator 12 has a field winding 13 and first and second separate sets of armature windings, each set comprising three windings interconnected in a 3-phase star configuration. The field winding is physically located on the rotor of the alternator 12, and the two sets of armature windings are physically located on the stator. In FIG. 1 the three different phases of the first set 14 of armature windings are respectively identified by the letters A, B, and C, and the three different phases of the second set 15 of duplicate windings are respectively identified by the letters A', B', and C'.

In a conventional manner, the engine 11 drives the alternator field 13 at a rotational speed determined by the position of an operator controlled 8-notch throttle in a Master Controller block 16. The throttle is suitably coupled to a main governor that controls the fuel supplied to the engine so as to maintain the actual engine speed substantially equal to the called for speed. (While neither the throttle nor the governor is shown in FIG. 1, both are conventional components of a diesel-electric locomotive.) Assuming there is direct current in the field winding 13, the resulting rotating magnetic field induces alternating voltages in the armature windings of the alternator 12. The armature windings are so arranged that the alternating voltage generated in the respective phases A, B, and C of the first set of windings 14 will be substantially in phase with the alternating voltages generated in the corresponding phases A', B', and C' of the second set 15. The fundamental amplitude of these voltages depends on both the speed of the engine 11 and the magnitude of field current. The latter current is supplied by suitable excitation means which is illustrated as a rotating exciter 17 also driven by the engine 11.

The exciter 17 has a series field winding 18 and a separately excited shunt field winding 19 which is energized by excitation control means 20. The latter means preferably comprises a constant horsepower excitation control arrangement such as is described and claimed in U.S. Pat. No. 3,878,400—McSparran assigned to the General Electric Company. Persons skilled in the art will understand that the referenced excitation control means 20 is effective to variably excite the alternator field winding 13 so as to control the electrical output of the alternator 12, with the normal level of field excitation being varied as necessary to prevent the actual values of selected electrical output parameters of the alternator (e.g., voltage, current, and their product) from respectively exceeding desired limits thereof. These limits are a function of the throttle setting. In this manner the power output of the alternator 12 can be matched to the available horsepower of the engine 11.

The dual sets of armature windings of the alternator 12 are connected via power rectifying means R to a pair of direct current (d-c) power buses 21p and 21n which in turn are adapted to be connected to a d-c load circuit. In the FIG. 1 embodiment of the invention, the load circuit comprises a plurality of d-c traction motors M1 and M2 permanently connected in parallel with one another between the d-c buses. These motors include series fields F1 and F2 which are connected through reversing contactors (not shown) to their respective armatures. The motor rotors are mechanically coupled by speed-reduction gearing to separate axle-wheel sets (not shown) of the locomotive for propelling or electrically retarding the vehicle. It should be understood that in normal practice a locomotive will have at least two and sometimes four more traction motors connected in parallel with M1 and M2.

The average magnitude of voltage across the d-c buses 21p and 21n determines motor speed. This voltage is detected by a conventional voltage transducer 22, and a representative signal is fed back on a line 23 to the excitation control means 20. The magnitude of load current out of the rectifying means R is a measure of motor torque and hence of tractive effort (assuming that the wheels of the locomotive maintain adhesion). A conventional current transducer 24 is provided to detect the total load current in the relatively positive bus 21p, and a signal representative of current magnitude is fed back to the control means 20 on a line 25.

The rectifying means R is formed by an array of uncontrolled electric valves or solidstate power rectifier diodes, herein also referred to as unilaterally conducting devices, which are interconnected and arranged between the alternator 2 and the d-c buses 21p and 21n in a special configuration that will now be described, whereby the alternating current (a-c) output of the alternator 12 is converted to a unidirectional current suitable for energizing the paralleled d-c traction motors. In the FIG. 1 embodiment of the invention, the rectifying means R has three legs connected in parallel circuit relationship between the d-c buses. A first one of the three legs comprises a first diode 1, a second diode 4, a third diode 1', and a fourth diode 4' connected in series with one another and polled to conduct current in a direction from bus 21n to bus 21p. The second leg comprises a first diode 3, a second diode 6, a third diode 3', and a fourth diode 6' also connected in series with one another and polled to conduct current from bus 21n to bus 21p. The third leg similarly comprises a first diode 5, a second diode 2, a third diode 5', and a fourth diode 2' connected in series with one another and polled to conduct current from 21n to 2p. While each unilaterally conducting device in the three legs of the rectifying means R has been shown and described in the singular, in practice it an actually comprise a unitary assembly of multiple diodes that are interconnected in parallel (to increase the forward current rating of the rectifier leg) and/or in series (to increase the reverse voltage rating of the rectifier leg).

The first set 14 of armature windings of the alternator 12 is connected to the respective legs of the rectifying means R by means of three lines 31, 32, an 33. More specifically, the line 31 interconnects phase AS and a point between the first and second diodes 1 and 4 of the first leg, the line 32 interconnects phase b and a point between the first and second diodes 3 and 6 of the second leg, and the line 33 interconnects phase C and a point between the first and second diodes 5 and 2 of the third leg. The second set 15 of armature windings of the alternator is correspondingly connected to the respective rectifier legs by means of three lines 34, 35, and 36, with line 34 interconnecting phase A' and a point between the third and fourth diodes 1' and 4' of the first leg, line 35 interconnecting phase B' and a point between the third and fourth diodes 3' and 6' of the second leg, and line 36 interconnecting phase C' and a point between the third and fourth diodes 5' and 2' of the third leg. Thus the two sets of windings 14 and 15 are effectively connected in parallel between the d-c buses 21p and 21n. This can be illustrated by considering the currents in the respective windings of the alternator during the period of time when the potential at the terminal of the phase A (and A') winding is more positive than the potential at the terminal of the phase C (and C') winding and the potential at the terminal of the phase B (and B') winding is more negative than the potential at the terminal of the phase C (and C') winding. At this time source current flows out of the first diode 1 of the first rectifier leg to the relatively positive d-c bus 21p, and having passed through the load circuit it returns from the negative bus 21n through the fourth diode 6' of the second leg. Between diodes 1 and 6' the current splits into two parallel paths: (1) through the line 35, phases B' and A' of the second set of armature windings, the line 34, and diodes 1' and 4'; (2) through diodes 3' and 6, the line 32, phases B and A of the first set of windings, and the line 31. Since each of these two paths includes the same number of diodes and since the phase A'-to-B' voltage has the same instantaneous magnitude and polarity as a phase A-to-B voltage the parallel paths share current substantially equally. Note that each of the outboard diodes 1, 3, 5, 2', 4', and 6' now has to conduct twice as much current as each of the inboard diodes 2, 4, 6, 1', 3', and 5'. Therefore the current ratings of these devices should be based on the higher duty of the outboard diodes, or the power rectifier assembly should be physically arranged so that the outboard diodes receive preferential cooling.

With the above-described arrangement, the output current of the alternator 12 is the sum of the currents from both sets of its armature windings, while the output voltage is essentially the same as the voltage of either set alone. Preferably each of the winding sets 14 and 15 has at least as high a full-load current rating as the prior art traction alternator with only one set of 3-phase armature windings, whereas each of the sets 14 and 15 has approximately one-half the voltage rating of the prior art machine. Therefore the current and voltage allocated to each of the two paralleled motors M1 and M2 when fed from the parallel-connected sets of alternator windings have magnitudes corresponding to those that would be applied if the motors were reconnected in series with each other and supplied by the prior art alternator. As was previously explained, this low voltage, high current mode of connection is desired for low speed, relatively high tractive effort operation of the locomotive.

As shown in FIG. 1, means is provided for interconnecting the respective junctures D, E, and F of the second and third diodes in all three legs of the rectifying means R. Preferably this interconnecting means comprises first switching means C1 connected between the juncture E of the diodes 6 and 3' in the second rectifier leg and the juncture D of the diodes 4 and 1' in the first rectifier leg, and second switching means C2 connected between juncture E and the corresponding juncture F of the diodes 2 and 5' in the third leg. The switching means C1 and C2 are shown in FIG. 1 as normally open contacts of electromechanical contactors whose operating coils are in a Transition Control block 40. Pneumatically closed, spring opened contactors are well suited for this purpose. Each has an open circuit state and a closed circuit state between which it is selectively switchable in response to transition command signals supplied from a Speed Event block 41 to the transition controls 40 over a line 42. Upon switching both of the contact C1 and C2 from open to closed circuit states, these contacts are effective to short circuit the junctures D, E, and F, whereby the connection of the two sets 14 and 15 of armature windings of the alternator 12 can be transitioned from parallel to series.

With both of the switching means C1 and C2 closed, the rectifying means R is reconnected in essence as two full-wave double-way rectifier bridges whose d-c terminals are disposed in series between the power buses 21$p$ and 21$n$. Now the new output voltage of the alternator is the sum of the voltages from both sets of armature windings 14 and 15, while the output current is the same as the current of either set alone. The current and voltage allocated to each of the two paralleled motors M1 and M2 when fed from the series-connected sets of alternator windings will have magnitudes corresponding to those that would be applied to the motors if supplied by the prior art alternator having only one set of 3-phase armature windings. This high voltage, low current mode of connection is desired for high speed, relatively low tractive effort operation of a locomotive. Note that each diode in the rectifier bridge R has approximately one-half the reverse voltage rating of each diode used in the rectifying means associated with the prior art alternator.

The speed event means 41, which supplies the above-mentioned transition command signals to the transition controls 40, receives a motor speed feedback signal over a line 43 from suitable means, such as a tachometer generator 44, for sensing the actual angular velocity of the rotor of one of the traction motors (or the angular velocity of the associated axle or wheel of the locomotive). In FIG. 1 the speed feedback signal is taken from motor M2, and it is in the form of a train of discrete pulses that recur at a frequency f proportional to the rotational speed of that motor. Alternatively, similar speed sensors could be associated with the other traction motor(s) and means could be provided for comparing the individual speed feedback signals so that the frequency of the signal on the line 43 is a measure of the average speed of all of the parallel motors.

The speed event means 41 is suitably constructed and arranged to initiate an "up" transition command signal indicating that the rotational speed of the motor M2 is increasing above a predetermined first threshold and to initiate a "down" transition command signal indicating that the motor speed is decreasing below a second threshold. The latter threshold is lower than the first. The transition control means 40 is operative in response to the production of the up transition command signal for causing the contacts C1 and C2 to switch from open to closed circuit states, and it is operative in response to the production of the down transition command signal for causing these contacts to switch from closed to open circuit states. The deadband or hysteresis between the first and second speed thresholds prevents control "chatter". Ideally the transition speed is selected to be that speed at which the excitation level of the alternator field for full power output with the alternator windings connected in parallel most closely approaches the excitation level for the same output with the windings connected in series. In one practical embodiment of the invention, the selected transition speed was approximately 50 km per hour. Alternatively, the transition commands could be based on the alternator output voltage and current (or voltage and current signals in the d-c motor circuits) attaining predetermined magnitudes or a critical ratio, instead of producing these commands in response to measured speed.

A preferred embodiment of the transition control means 40 is shown functionally in FIG. 2 which will now be described. The signal on the input line 42 of the transition control is either high (i.e., "1") or low (i.e., "0"), depending on the frequency f of the motor speed feedback signal that is supplied to the speed event means 41 (FIG. 1). The input signal is low whenever f is higher than a preset amount $f_1$ that corresponds to the aforesaid first threshold of motor speed, and it is high whenever f is lower than another preset amount $f_2$ that corresponds to the aforesaid second threshold of motor speed. Starting at a frequency lower than $f_2$, as f increases from below to above $f_1$, the input signal changes from high to low, and as f subsequently decreases from above to below $f_2$, the input signal reverts to its original high state. The resulting motor speed vs. input signal relationship is tabulated in the insert that is shown in FIG. 2 under the line 42.

The input signal on the line 42 triggers an inverting and temporary seal-in circuit 45 whose purpose and operation will soon be explained. The circuit 45 includes a conventional bistable flip flop means 46 that produces on an output line 47 a digital signal which changes from low to high (0-to-1) concurrently with a 1-to-0 signal change on the input line 42 and that changes from high to low (1-to-0) concurrently with a 0-to-1 signal change on the line 42. The rising or positive edge of a high signal on the line 47 is herein referred to as the up transition command signal, and the falling or negative edge of a high signal on this line is herein referred to as the down transition command signal.

Figure 2:
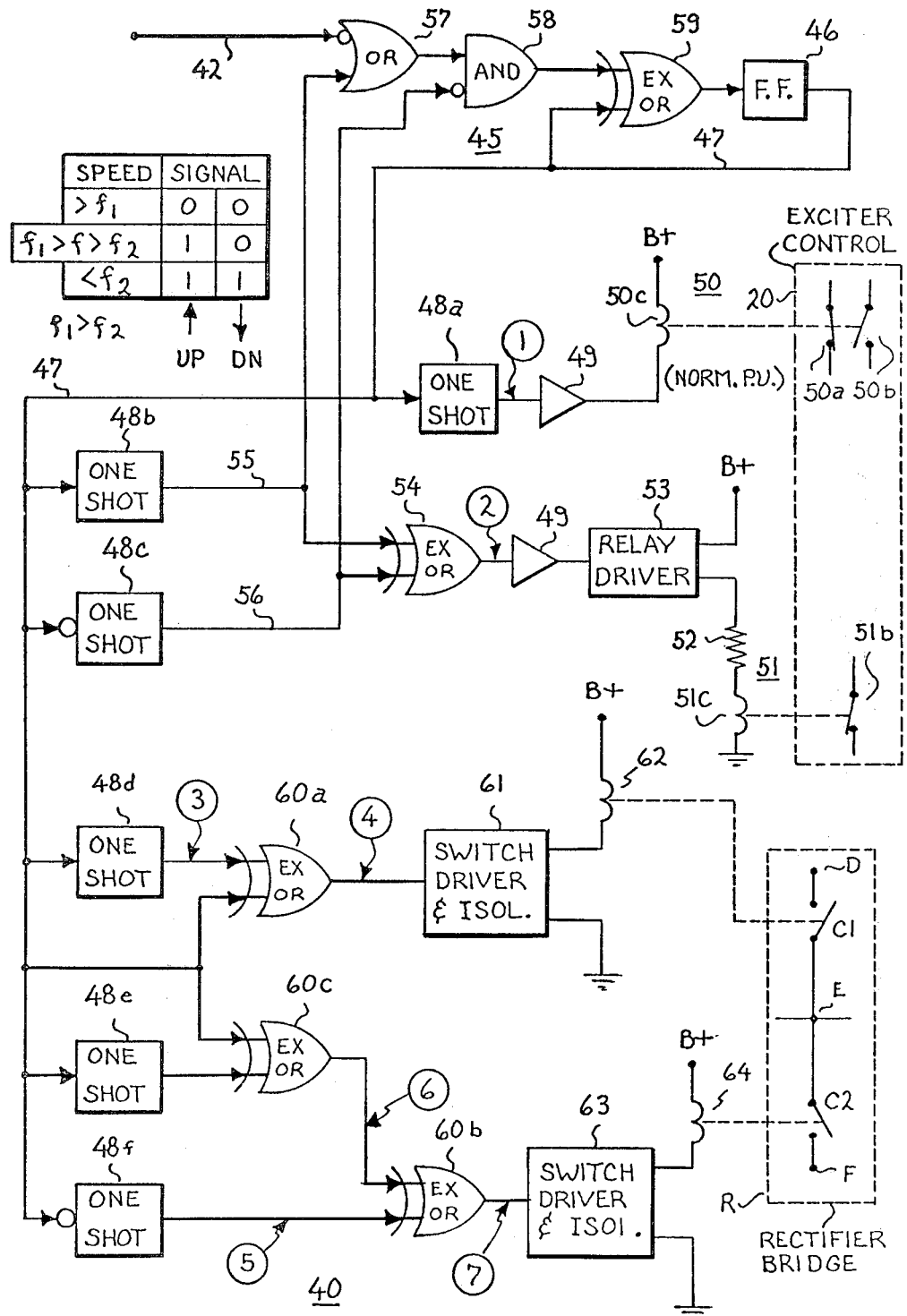
FIG. 2 is a functional block diagram of the transition controls shown as a single block in FIG. 1.

The line 47 is connected to the inputs of a plurality of monostable multivibrators 48a, 48b, 48c, 48d, 48e, and 48f, each labeled "One Shot" in FIG. 2. When triggered by a rising edge of a valid high signal on the line 47 (or, in the case of the devices 48c and 48f, by a falling edge of such a signal), each of these devices produces a discrete output pulse of preselected width. The duration or width of the output pulse is determined by the parameters of an external resistor-capacitor timing circuit (not shown). Before triggering occurs, the one-shot device is in a quiescent state with its output low or "0". Hardware well suited for this purpose is known as a retriggerable monostable multivibrator and is commercially available (model MC1453B) from Motorola Semiconductor Products, Inc.

Figure 3:
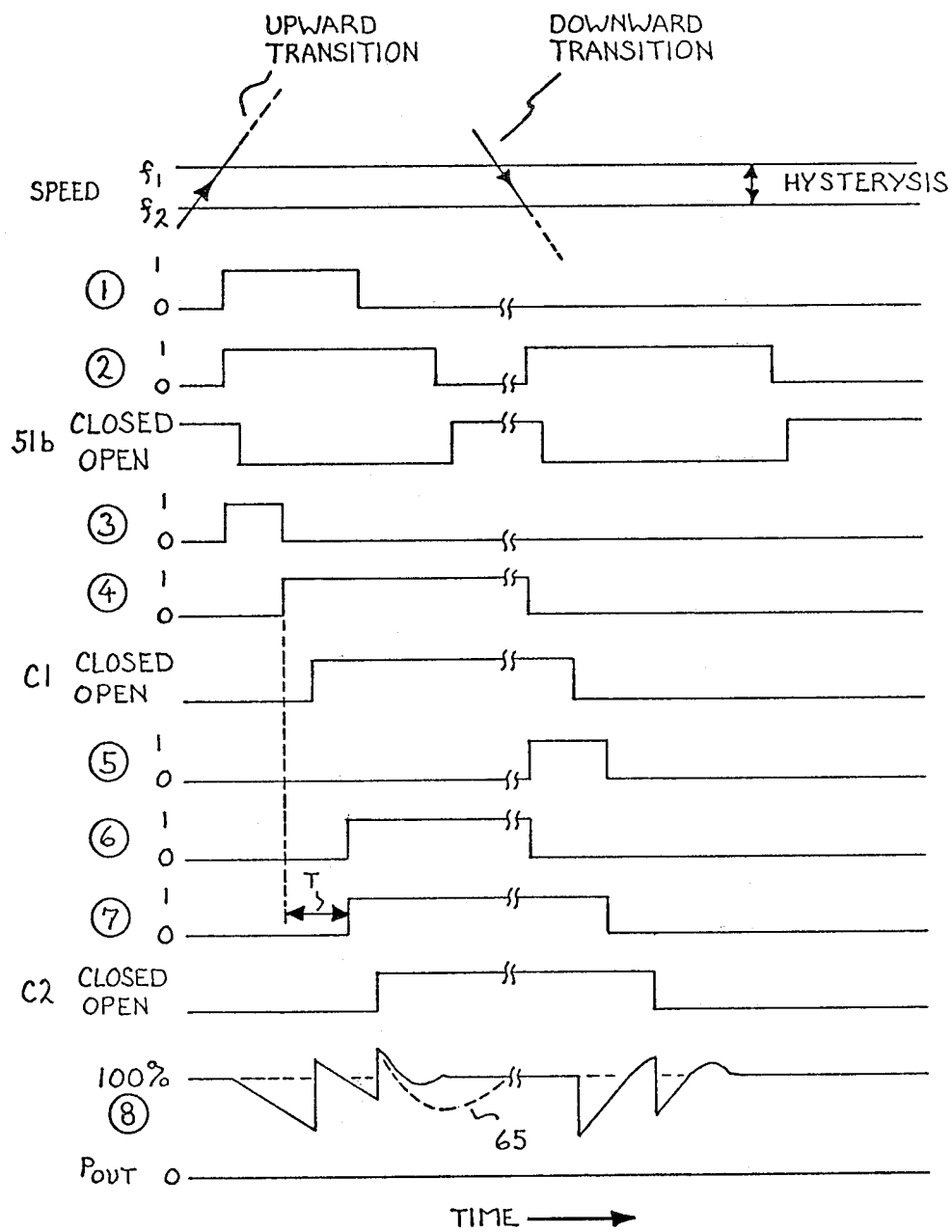
FIG. 3 is a chart showing the states of various signals identified in FIG. 2 during an upward transition interval and also during a subsequent downward transition interval.

During an upward transition (i.e., when the connection of the two sets of alternator windings is changed from parallel to series by closing the switching means C1, C2 in response to increasing motor speed), it is desirable, before initiating the closing operation of the switching means, to reduce the output power of the alternator by reducing the excitation level of its field. For this purpose means has been provided for removing the source of excitation from the exciter shunt field 19 and for boosting the excitation of the exciter series field 18 in response to a high output pulse from the device 48a. In the embodiment that is illustrated in FIG. 2, this means comprises a relay 50 having at least two contacts 50a an 50b and on operating coil 50c. The coil 50c is connected between the positive terminal B+ of a source of relatively constant control power (e.g., a 74-volt battery, not shown) and the output of a buffer amplifier 49 whose input is connected in turn to the output terminal of the first one-shot device 48a. So long as there is no output pulse from the device 48a, the coil 50c is energized an the relay 50 is maintained in its picked up state with contact 50a closed and contact 50b open. The contacts 50a and 50b are located in the exciter control block 20 where they are associated with circuits energizing the shunt field 19 and the series field 18, respectively. As is explained in more detail below in conjunction with the description of FIG. 5, the alternator field is excited at a normal level while the relay 50 is picked up, but field excitation is reduced below normal when this relay is dropped out. The relay coil 50c is temporarily de-energized, whereby the excitation reducing relay 50 drops out, substantially concurrently with the output pulse from the one shot 48a. This pulse, as is depicted by the No. 1 trace in FIG. 3, is a high or "1" signal. It commences with the up transition command signal (i.e., the rising edge of a high signal on the line 47) which marks the 1-to-0 signal change on the input line 42 of the transition control means 40 due to motor speed (f) increasing above the predetermined first threshold ($f_1$), and its width or duration is preferably preselected to be of the order of 0.45 second. As will soon be apparent, approximately half of this reduced excitation time elapses before the open-to-closed state changing action of the switching means C1, C2 is initiated.

As is also more fully explained below, the exciter control means 20 includes normally enabled stabilizing means responsive to the rate of change of the excitation level for affecting operation of the excitation control means in a rate limiting manner, and means is provided for temporarily disabling this stabilizing means upon the production of either an up transition command signal or a down transition command signal. In the presently preferred embodiment, the disabling means comprises a relay 51 having a normally closed contact 51b in the stabilizing circuit (not shown in FIG. 2) of the exciter control and having an operating coil 51c which is connected by way of a series resistor 52 and a relay driver 53 between the control power terminal B+ and ground. The relay driver 53 responds to the output of an EXCLUSIVE OR logic circuit 54 to which it is coupled through a buffer amplifier 49. The two inputs of the EXCLUSIVE OR circuit 54 are in turn connected via lines 55 and 56 to the respective output terminals of the second and third one-shot devices 48b and 48c. Whenever there is a high output pulse from either of the devices 48b or 48c (but not both), the circuit 54 provides a high output signal that activates the relay driver 53, whereby the coil 51c is energized and the disabling relay 51 is picked up, in which state its contact 51b is held open to effect disabling of the exciter stabilizing means.

As is depicted in FIG. 3 by the trace No. 2, a high output signal from the EXCLUSIVE OR circuit 54 commences with either the up transition command signal which triggers the one-shot device 48b or the down transition signal which triggers the one-shot device 48c. The latter signal, as was previously explained, is the falling edge of a high signal on line 47, and it marks the 0-to-1 signal change on the input line 42 of the transition control means 40 due to motor speed (f) decreasing below the predetermined second threshold ($f_2$). (By connecting the line 47 to the negative-edge triggering input of the device 48c are indicated symbolically in FIG. 2, this device is made responsive to the down transition command signal.) By appropriately preselecting the timing components associated with the one shots 48b and 48c, respectively, the signal No. 2 will continue in its high state for an interval of approximately 0.8 second following an up command signal, whereas it will continue in its high state for an interval of approximately 0.7 second following a down command signal. In either case, the intervals are appreciably longer than the time that elapses from the production of the transition command signal to the conclusion of the resulting state changing action of the switching means C1, C2. As is indicated in FIG. 3, the relay contact 51b opens in slightly delayed response to the 0-to-1 changes of the signal No. 2, and it recloses in slightly delayed response to the subsequent 1-to-0 changes of this signal.

As it is shown in FIG. 2, the inverting and temporary seal in means 45 of the transition control block 40 comprises an OR logic circuit 57, an AND logic circuit 58, and an EXCLUSIVE OR logic circuit 59, in addition to the flip-flop means 46. The input line 42 of the transition control block is connected to an inverting input of the OR circuit 57, and the output line 55 of the second one-shot device 48b is connected to the other input of this circuit. Consequently, the output signal of the OR circuit 57 is in a high state whenever either the input signal on the line 42 is low ("0") or there is a high ("1") pulse on the line 55. One of the two inputs of the AND circuit 58 is connected to the output of the OR circuit 57. The other input of the circuit 58, an inverting input, is connected to the output line 56 of the third one-shot device 48c, and thus the output of the AND circuit 58 is in a high state only when there is a high signal out of the OR circuit 57 and no high pulse on the line 56. The output of the AND circuit 58 is connected to a first input of the EXCLUSIVE OR circuit 59, and the line 47 is connected to the second input of the latter circuit.

The output of the circuit 59 is in turn connected to the input of the flip-flop means 46.

Assuming that initially the flip flop 46 is in a reset state (i.e., the signal on its output line 47 is low) and both of the one-shot devices 48b and 48c are in quiescent states (i.e., the signals on both of the lines 55 and 56 are low), the first 1-to-0 signal change on the input line 42 is immediately reflected by a 0-to-1 signal transition at both the first input and the output of the EXCLUSIVE OR circuit 59. This causes the flip flop 46 to change states and thereby raise the level of the signal on line 47 from low to high. At the same time, the one shot 48b is triggered so that the signal on line 55 correspondingly changes to a high state, while the input signal to the flip flop 46 reverts to a low state (because both inputs to the EXCLUSIVE OR circuit 59 are now high). During the preset timing interval of the one shot 48b, the OR circuit 57 ensures that the first input to the EXCLUSIVE OR circuit 59 remains high, thereby temporarily preventing any further state change by the flip flop 46. Subsequently, once the high pulse on line 55 terminates, any 0-to-1 signal change on the input line 42 of the transition control means results in a 1-to-0 signal transition at the first input of the EXCLUSIVE OR circuit 59, and the latter circuit now supplies a high signal to the input of the flip flop 46 which causes this device to change states again and thereby lower the level of the signal on line 47. At this time the one-shot device 48c is triggered so that the signal on line 56 changes to a high state, while the input signal to the flip flop 46 will revert to a low state (because both inputs to the EXCLUSIVE OR circuit 59 are now low). During the preset timing interval of the one shot 48c, the AND circuit 58 ensures that the first input of the circuit 59 remains low, thereby temporarily preventing any further state change by the flip flop 46.

The purpose of the temporary seal-in circuit 45 just described is to ensure that the signal on the line 47 is sustained in its high (or low) state without interruption for at least a predetermined minimum period of time following each state change of the flip-flop device 46, thereby allowing time for the up (or down) transition to be completed, once initiated, even if the signal on the input line 42 were prematurely to revert to its prior state. When the output pulse from the one-shot device 48b (or 49c) terminates after an up (or down) transition has been completed, the temporary seal-in effect is negated and the flip flop 46 is again free to produce a state change of the signal on its output line 47 in response to any intervening or subsequent state change of the input signal supplied to the transition control means 40.

As was previously mentioned, actuation of the switching means C1, C2 from open to closed circuit states is delayed, after the production of an up transition command signal, in order to allow time for the alternator field excitation to decrease below normal (as a result of the excitation reducing relay 50 dropping out) before the switching operation is initiated. In FIG. 2 this delay is introduced by the fourth one-shot device 48d whose output is connected to a first input of an EXCLUSIVE OR logic circuit 60a. The line 47 is connected to the second input of the circuit 60a, and the output signal of this circuit provides an input to a switch driver and isolating block 61 that is part of the actuating means for the contact C1. The switch driver 61 connects the operating coil 62 of the contact C1 between B+ and ground. So long as the input signal to the switch driver 61 is not high, the coil 62 is de-energized and the contact C1 is open, but a high input signal will activate the switch driver, whereby the coil 62 is energized and the contact C1 is closed. In FIG. 3 the high and low states of the output pulse from the one shot 48d and the input signal to the switch driver 61 are depicted by traces Nos. 3 and 4, respectively.

The timing components of the one shot 48d are preselected so that once triggered by an up transition command signal on the line 47 this device produces an output pulse (trace No. 3) having a duration of approximately 0.2 second, during which time the input signal (trace No. 4) to the switch driver 61 continues to be low ("0") because both inputs of the EXCLUSIVE OR circuit 60a are then high. The signal No. 4 rises to a high level upon termination of a high pulse from the device 48d, and it remains high ("1") until the next down transition command signal (i.e., a 1-to-0 signal change) on the line 47. The 0-to-1 change of the signal No. 4 initiates the contact closing operation of the switch driver 61, and a short time thereafter (due to electrical and mechanical inertia) the contract C1 is actually moved from its open circuit position to its closed circuit position. A subsequent 1-to-0 change of the signal No. 4 initiates the contact opening operation of the switch driver 61, and a short time thereafter (again due to electrical and mechanical inertia) the contact C1 is actually moved from its closed circuit position to its open circuit position.

In accordance with the present invention, the second contact C2 of the switching means is closed (or opened) in sequence rather than simultaneously with the companion contact C1. Staggering the operations of these two contacts will desirably reduce the size of the increment (or decrement) in alternator output power that accompanies an upward (or downward) transition. If both contacts closed simultaneously to change the connection of the two sets of alternator armature windings from parallel to series in one step, the rectified output voltage of the alternator would tend abruptly to double, and consequently the output power (proportional to the voltage squared) would tend to quadruple. This could result in bogging of the engine 11 and smoke in the engine exhaust stack, and it could cause fast acceleration and potential overspeed of the turbocharger. These factors plus the resulting jerky acceleration of the locomotive would adversely stress the couplers that mechanically join the locomotive to the adjacent car of the train of rail cars being propelled by the locomotive and that join the respective cars to one another. Related problems would be observed during a downward transition if the contacts C1 and C2 were opened simultaneously to change the alternator winding connection from series to parallel in one step, in which case the sudden loss of alternator output power would result in an appreciable decrease in the turbocharger speed which in turn would impede the full-load restoring response of the excitation system. It has been found that in either case the transition is significantly smoother and faster and the train handling is noticeably better when the first and second switching means C1 and C2 are operated in sequence and, as previously described, the excitation stabilizing means is disabled during the transition process.

In order to cause the second contact C2 to close after the first contact C1 has been closed in response to an up transition command signal, the means illustrated in FIG. 2 for actuating the contact C2 includes the fifth one-shot device 48e, and the duration of the ouptut pulse of this device is preselected to be approximately 0.4 second which is appreciably longer than the duration of the output pulse from the above-described one shot 48d. The output of the device 48e is connected to a first input of an EXCLUSIVE OR logic circuit 60c, whereas the line 47 is connected to the second input of this circuit. The output of the circuit 60c is in turn connected to a first input of another EXCLUSIVE OR logic circuit 60b whose second input is connected via the sixth one-shot device 48f to the line 47. The line 47 is actually connected to the negative-edge triggering input of the one-shot device 48f, as is indicated symbolically in FIG. 2, whereby this device responds to the down transition command by producing a high output pulse (trace No. 5 in FIG. 3) having a preselected fixed duration (e.g., 0.25 second). Thus during the upward transition the signal (No. 5) supplied to the second input of the circuit 60b is always low, whereas the signal supplied to the first input of this circuit will, as indicated by trace No. 6 in FIG. 3, rise to a high level upon termination of a high pulse from the one-shot device 48e which occurs in delayed response to the up transition command signal. The resulting output signal of the circuit 60b is depicted by trace No. 7 in FIG. 3.

The output signal of the EXCLUSIVE OR circuit 60b provides an input to a switch driver and isolating block 63 that is part of the actuating means for the contact C2. The switch driver 63 connects the operating coil 64 of the contact C2 between B+ and ground. So long as the input signal (No. 7) to the switch driver 63 is not high, the coil 64 is deenergized and the contact C2 is open, but a high input signal will activate the swtich driver, whereby the coil 64 is energized and the contact C2 is closed. The 0-to-1 change of the signal No. 7 that initiates the open-to-closed state changing action of C2 occurs a predetermined interval of time after the corresponding action of the contact C1 has been initiated by signal No. 4 in delayed response to an up transition command. This time interval, which in the FIG. 2 embodiment is determined by the difference (e.g., 0.2 second) between the fixed time delays respectively introduced by the devices 48d and 48e, is indicated by the reference letter T in FIG. 3. A short time after signal No. 7 rises to a high level, the contact C2 is actually moved from its open circuit position to its closed circuit position.

Once the contact C2 is closed, the one-shot device 48f delays subsequent initiation of a closed-to-open state changing action of C2 until a predetermined interval of time after the corresponding action of the contact C1 has been initiated by the 1-to-0 change of the signal No. 4 in response to a down transition command. The output signal (No. 7) of the circuit 60b will remain high until both of the input signals (Nos. 5 and 6) to this circuit fall to their low states in delayed response to the down command signal, whereupon the signal No. 7 changes to a low state and, after further delay due to electrical and mechanical inertia, the contact C2 is moved from its closed circuit position to its open circuit position. In the FIG. 2 embodiment the time interval between the 1-to-0 changes of the two signals 4 and 7 is equal to the fixed duration (e.g., 0.25 second) of the high output pulse from the one shot 48f.

The operation of the above-described transition control means 40 to cause an upward (or downward) transition of the switching means C1, C2 will now be reviewed with the aid of FIG. 3 in which the trace No. 8 represents the per unit magnitude of the electrical power output of the alternator 12 as a function of time. The upward transition commences with the production of an up command signal in response to the frequency of an increasing speed feedback signal intersecting the pedetermined level $f_1$ which corresponds to the first threshold of the traction motor speed, and at this time the signals 1, 2, and 3 immediately rise to high states in which they will temporarily remain. A high No. 1 signal causes relay 50 to drop out, thereby reducing the alternator field excitation, and a high No. 2 signal causes the relay 51 to pick up, thereby disabling the stabilizing circuit in the excitation control means 20. Consequently the field excitation begins to decrease below its normal level at a fast rate, the amplitude of the voltages generated in the individual alternator windings correspondingly decreases, and the alternator power (trace No. 8 in FIG. 3) ramps downward from 100 percent of the limit being called for by a power reference circuit in the excitation control means 20. After a delay corresponding to the period of time that the signal No. 3 is high, signal 4 rises to a high state which initiates closure of the first contact C1 of the switching means. When C1 is closed it provides a conducting path of negligible resistance between the junctures D and E of the power rectifier bridge R (FIG. 1), whereby the phase A-to-B output of the first set 14 of alternator windings is connected in series with the phase A'-to-B' output of the other set 15. With C1 closed and C2 open, an unbalanced condition exists. In this unbalanced or hybrid condition, the connection of the two sets of alternator windings is partly parallel and partly series, and the voltage (and current) waveforms of the individual windings are highly distorted compared to pure sinewaves of equal amplitudes.

At the same time that the first switching means actually closes its contact C1 there is a step increase in the output power of the alternator due to the summing of the phase-to-phase voltages generated in the two phases of the respective sets of alternator windings that are now serially interconnected. (This increment would have been larger if C2 were closed simultaneously with C1.) After C1 closes the field excitation continues to decrease at a fast rate, and the alternator power (trace No. 8) again ramps downward as shown in FIG. 3 until the second contact C2 of the switching means is closed in response to signal No. 7 changing from low to high states. This state changing event of the signal 7, which occurs when signal 6 rises to a high state in delayed response to the production of the up transition command signal, is delayed a sufficiently long time to ensure that C2 closes after C1. Shortly after signal No. 6 goes high, the signal No. 1 will fall to its low state, whereupon the excitation reducing relay 50 picks up to terminate its period of reduced excitation.

When the contact C2 of the second switching means is acutally moved to its closed position, it provides a conduction path of negligible resistance between the junctures E and F of the power rectifier bridge R, thereby completing the series connection of the two alternator winding sets 14 and 15. At the same time there is another step increase in the output power of the alternator due to the summing of the phase-to-phase voltages generated in all three phases of the respective sets of alternator windings. The excitation control means 20 is now effective to vary the normal level of alternator field excitation at a fast rate, unlimited by the excitation stabilizing means which is still temporarily disabled, and the difference between actual and reference values of the alternator output power is rapidly reduced. This regulating action quickly restores the output power to 100 percent of its desired value, and acceleration of the locomotive can continue without noticeable surge of power or speed. Some time after completion of the open-to-closed switching operation of the second contact C2, the signal No. 2 will fall to its low state and the relay 51 will consequently drop out to terminate the disabled period of the excitation stabilizing means.

In summary, the upward transition is carried out relatively smoothly and quickly, with good train handling characteristics, by first temporarily reducing alternator field excitation below normal and disabling the normally enabled excitation stabilizing means, and by then closing the two contacts of the switching means C1, C2 in sequence. If the stabilizing means in the excitation control means 20 were not disabled throughout this transition, it would impede and prolong restoration of the desired output power after the period of reduced excitation terminates, as is indicated by way of example by the broken line 65 in FIG. 3.

A subsequent downward transition commences with the production of a down command signal in response to the frequency of a decreasing speed feedback signal intersecting the predetermined level $f_2$ which corresponds to the second threshold of traction motor speed, and at this time the signals 2 and 6 immediately rise to high states in which they will temporarily remain. A high No. 2 signal causes the relay 51 to pick up, thereby disabling the excitation stabilizing circuit in the excitation control means 20. The down command also causes signal 4 to fall to a low state which initiates opening of the first contact C1 of the switching means. With C1 open and C2 closed, the unbalanced, hybrid condition again exists, and the connection of the two alternator windings sets 14 and 15 is partly parallel and partly series.

At the same time that the first switching means actually opens its contact C1 there is a step decrease in the output power of the alternator. (This decrement would have been larger if C2 were opened simultaneously with C1.) After C1 opens, the excitation control means 20 increases the normal level of alternator field excitation at a fast rate, the fundamental amplitudes of the voltages generated in the individual alternator windings correspondingly increase, and consequently the alternator power (trace No. 8 in FIG. 3) ramps upward until the second contact C2 of the switching means is opened in response to signal No. 7 changing from high to low states. The latter state changing event of the signal 7 occurs when signal 5 falls to a low state in delayed response to the production of the down transition command signal.

With both contacts of the switching means C1, C2 open, the two alternator winding sets 14 and 15 are effectively connected in parallel with one another. At the same time that C2 moves to its open circuit position, there is another step decrease in the output power of the alternator due to the paralleling of the phase-to-phase voltages generated in all three phases of the respective sets of alternator windings. The excitation control means continues to vary the normal level of alternator field excitation at a fast rate, unlimited by the excitation stabilizing means which is still temporarily disabled, and the difference between actual and reference values of the alternator is rapidly reduced. This regulating action quickly restores the output power to 100 percent of its desired value, and deceleration of the locomotive can continue without a precipitous loss of power or speed. Sometime after completion of the closed-to-open switching operation of the second contact C2, the signal No. 2 will fall to its low state and the relay 51 will consequently drop out to terminate the disabled period of the excitation stabilizing means. In summary, the downward transition is carried out relatively smoothly and quickly, with good train handling characteristics, by temporarily disabling the normally enabled excitation stabilizing means and by opening the two contacts of the switching means C1, C2 in sequence.

Figure 4:
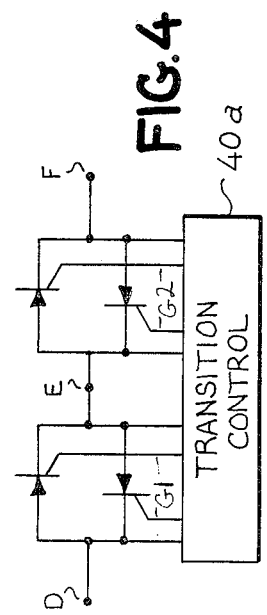
FIG. 4 is a schematic diagram of an alternative form of the switching means shown in FIG. 1.

While the first and second switching means C1 and C2 are preferably conventional electromechanical contactors, each of these contacts could, if desired, be replaced by a solid state equivalent comprising inverse-parallel connected controlled rectifiers. Such an alternative is illustrated in FIG. 4 where a first pair of inverse parallel controlled rectifiers (depicted symbolically as simple thyristors) is shown connected between the junctures D and E and a second pair of such rectifiers is shown connected between the junctures E and F. For actuating these devices the control electrodes or gates G1 of the first pair of thyristors and the control electrodes or gates G2 of the second pair of thyristors are connected to an associated transition control block 40a. This block is operative in delayed response to the production of an up transition command signal to initiate open-to-closed state changes of the respective thyristor pairs, and it is also operative in response to the production of a down transition command signal to initiate closed-to-open state changes of the respective thyristor pairs. In order to initiate open-to-closed state changing action of the first pair of thyristors, the block 40a supplies firing signals to the respective gates G1, thereby enabling each of these thyristors in turn to switch to its low resistance, forward conducting (i.e., closed circuit) state when its main electrodes are forward biased by a small potential difference between junctures D and E. To initiate the closed-to-open state changing action of the first pair of thyristors, the aforesaid firing signals are inhibited or suppressed, whereupon each thyristor in turn reverts to its high resistance, non-conductive (i.e., open circuit) state when its main electrodes are next reversed biased by the voltage between D and E. The second pair of thyristors is similarly actuated between open and closed circuit states by firing signals supplied to their respective gates G2. Preferably, for reasons heretofore explained in connection with the description of FIGS. 2 and 3, the transition control block 40a includes suitable means for delaying the initial production and the later suppression of firing signals that are supplied to the gates G2 of the second pair of thyristors with respect of the firing signals that are supplied to the gates G1 of the first pair of thyristors, whereby the two pairs of thyristors are respectively turned on in sequence in response to an up transition command signal and are respectively turned off in sequence in response to a down transition command signal.

A preferred embodiment of the excitation control means 20 is shown functionally in FIG. 5 which will now be described. The shunt field winding 19 of the exciter 17 is connected between B+ and ground in series circuit relationship with a current limiting resistor 76 of relatively low ohmic value, the closed contact 50a of the abovedescribed excitation reducing relay 50, a movable contact of an exciter field relay 102, a line 101, a transistor Q4, and a diode 75. The series combination of winding 19 and resistor 76 is shunted by another resistor 67. The exciter field relay 102 is actuated by a fault detector 100 which preferably is constructed and arranged in accordance with the teachings of U.S. Pat. No. 4,200,832— Johansson and Schneider, which patent is assigned to the General Electric Company. The detector 100 is connected across the field switch Q4, and it will respond to an overexcitation condition by moving the contact of the relay 102 into engagement with a line 104 that is part of a reduced excitation circuit in the detector 100.

The series field winding 18 of the exciter 17 is connected in series with a resistor 68 between B+ and ground, and it is differentially wound with respect to the shunt field so that the continuous trickle of current in this winding provides a small opposing magnetic field that will cancel residual flux in the exciter whenever the shunt field winding 19 is de-energized. A first end of the armature winding of the exciter 17 is connected to the juncture of the series field 18 and the resistor 68, and since the ohmic value of the series field is very low the potential at the first end of the exciter armature is virtually the same as that of the positive battery terminal B+. The shunt field 19 is polled so that the second end of the exciter armature has a more positive potential than the first end.

The transistor Q4 in series with the shunt field 19 is preferably operated as an intermittently conductive switching means whose proportion of conductive time is variable. Such switching means is usually referred to as a field switch. Its base electrode is connected to an associated field switch driver block 69 which provides a control signal normally characterized by a rectangular waveform having a relatively constant frequency (e.g., 200 Hz) but variable pulse width. During periods when the control signal is high (i.e., positive with respect to ground, Q4 is fully turned on, whereas during spaces between such periods it is completely turned off. The relative duration or width of successive positive pulses of the control signal, and hence the per cycle proportion of on time of the field switch Q4 (hereinafter referred to as the duty cycle of this switch), is modulated as a function of an error voltage appearing at a comparison junction J.

Figure 5:
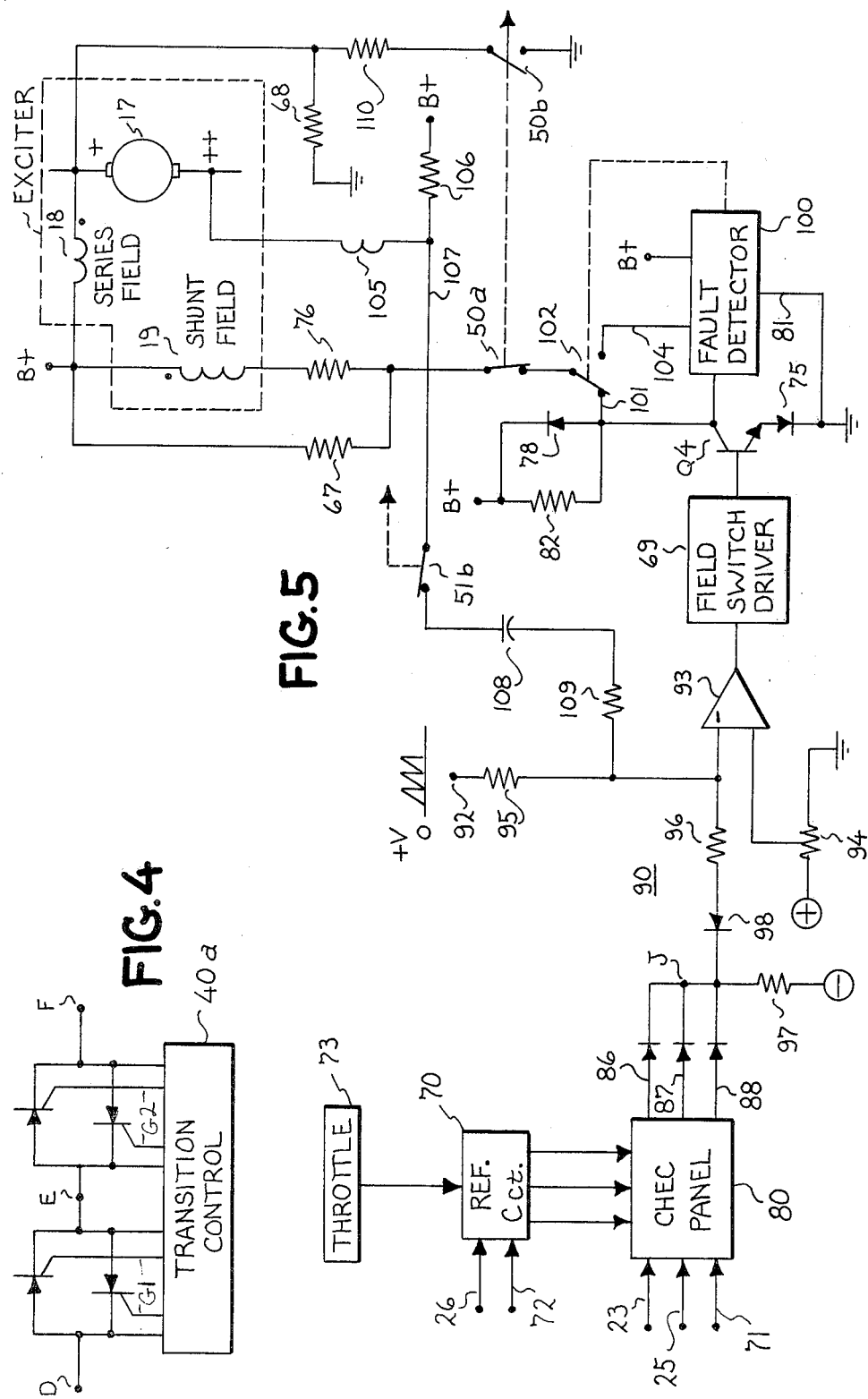
FIG. 5 is a schematic circuit diagram, partly in block form, of the excitation control block shown in FIG. 1.

As is indicated in FIG. 5, the comparison junction J receives input signals on a plurality of lines 86, 87, and 88. The various input signals which are provided on these lines are developed in a constant horsepower excitation control panel 80, labeled "CHEC Panel." Preferably the panel 80 and an associated reference signal circuit 70 are constructed and arranged in the manner disclosed in U.S. Pat. No. 3,878,400—McSparran. Briefly summarized, the panel 80 has three input lines 23, 25, and 71 on which it receives signals representative of the actual values of alternator output voltage, alternator output current, and turbocharger speed, respectively. The signals on lines 23 and 25 are multiplied in the control panel to derive a signal representative of the actual magnitude of the electrical power output of the alternator 12. The panel 80 also receives from the reference circuit 70 signals representative of desired limits of alternator voltage and current and of a reference magnitude of alternator output power. The signals from the reference circuit 70 are varied as functions of the setting of a locomotive throttle 73, and they are also influenced by other inputs supplied to the circuit 70 on lines 26 and 72.

The excitation control panel 80 is operative to provide on the line 86 a signal representative of the difference between actual and limit values of the voltage output of the alternator and to provide on the line 87 a signal representative of the difference between actual and limit values of output current. The signal applied to the line 88 is representative of the difference between the actual magnitude of alternator output power and a desired level which normally coincides with the reference magnitude of output power as scheduled by the reference circuit 70 signals representative of desired limits of alternator voltage and current and of a reference magnitude of alternator output power. The signals from the reference circuit 70 are varied as functions of the setting of a locomotive throttle 73, and they are also influenced by other inputs supplied to the circuit 70 on lines 26 and 72.

The excitation control panel 80 is operative to provide on the line 86 a signal representative of the difference between actual and limit values of the voltage output of the alternator and to provide on the line 87 a signal representative of the difference between actual and limit values of output current. The signal applied to the line 88 is representative of the difference between the actual magnitude of alternator output power and a desired level which normally coincides with the reference magnitude of output power as scheduled by the reference circuit 70 but which, for reasons and in a manner explained in the above-referenced McSparran patent, tracks the turbo speed signal on the line 71 when the scaled value of the latter signal is lower than the reference magnitude of power due to the turbocharger speed being below par (as happens during transient speed and load changes, such as occur in response to a step-wise advance of the throttle 73 to accelerate the engine or in response to a rapid unloading of the engine). So long as the actual value of the selected parameter is lower than the associated limit, the polarity of each of the input signals on the three lines 86, 87, and 88 will be relatively negative. These lines are respectively connected via isolating diodes to the junction J which in turn is connected through a resistor 97 to a relatively negative control power terminal so that the error voltage at J is determined by whichever input signal has the least negative potential.

The error voltage at the junction J controls a modulator 90 which cyclically activates the field switch diver 69 whose output is the periodic signal that controls the on-off state of the field switch Q4. The modulator 90 comprises a suitable sawtooth waveform source 92 and an operational amplifier 93 used in a differential mode. The non-inverting input of the op amp 93 has a predetermined bias which is virtually at ground potential; for adjustment purposes the bias voltage is actually taken from the slider of a potentiometer 94 connected between a positive control power terminal and ground. The inverting input of the op amp 93 is connected through a resistor 95 to the source 92 of sawtooth voltage waves, and it is also connected through a resistor 96 and a diode 98 to the comparison junction J. The algebraic sum of the sawtooth voltage at 92 and the error voltage at J is divided by the resistors 95 and 96. So long as the potential at the junction of these resistors remains below (less positive than) the bias of the non-inverting input of the op amp 93, the output of this amplifier is high. On the other hand, if the junction potential is above the bias voltage, the op amp has a low output state. The amplifier 93 begins each sawtooth cycle in a high output state and then is switched to a low output state as soon as the junction potential rises above the bias voltage. The larger (more negative) the error voltage, the later amplifier is switched in each cycle to its output state. It will be apparent that the period of high output normally is proportional to the magnitude of the error voltage.

The output of the amplifier 93 of the modulator 90 is applied to the field switch driver 69, and each time it switches from low to high states the driver 69 provides a discrete positive control signal that turns on the intermittently conductive series field switch Q4. When the modulator subsequently switches from high to low output states, this control signal is discontinued and the field switch is turned off. The average value of current flowing through the exciter field 19 varies with the duty cycle of the switch Q4. The ohmic value of the current limiting resistor 76 in series with the field 19 is chosen so that a desired normal maximum level of excitation can be realized at maximum permissible temperature with the field switch being pulsed on for a relatively high proportion of each cycle. This condition is obtained for error voltages of relatively large magnitudes. As the actual output of the alternator approaches the desired limit for a given throttle position, the error voltage will decrease (becomes less negative) so as to reduce the duty cycle of the field switch Q4, and a zero error voltage will keep the field switch turned off continuously. In this manner the excitation of the exciter shunt field 19 (and hence the normal level of excitation of the alternator field 13) is varied as necessary to prevent the actual values of alternator output voltage, current, and power from exceeding their respectively desired limits as established by the reference signal circuit 70.

In order to stabilize the normal operation of the exiter control means shown in FIG. 5, an inductor 105 and a series resistor 106 are connected between the second end of the exciter armature and the battery terminal B+, and the juncture of these components is connected via a line 107, a coupling capacitor 108, and a resistor 109 to the junction of resistors 95 and 96 in the modulator 90. Any abrupt change in the magnitude of the output voltage of the exciter 17 is reflected by a high di/dt in the inductor 105 and a correspondingly high dv/dt on the line 107. The resulting current in the coupling capacitor 108 introduces a bias at the junction to which the inverting input of the op amp 93 is connected, and this bias has a restraining or stabilizing effect on the excitation control. More specifically, when the exciter voltage tends to increase at a high rate, the stabilizing means responds by raising the junction potential, thereby reducing the duty cycle of the field switch Q4 and consequently limiting the rate of increase, whereas the exciter voltage tends to fall at a high rate, the stabilizing means will respond by lowering the junction potential, thereby increasing the duty cycle of Q4 and consequently limiting the rate of fall. Thus the stabilizing means affects operation of the excitation means in a rate limiting manner.

The previously described normally-closed contact 51b of the relay 51 (FIG. 2) is connected in the line 107 of the normally enabled stabilizing circuit. This contact is open whenever the relay 51 is picked up, as is true during the up and down transitions of the switching means C1, C2. Opening the contact 51b decouples the line 107 from the junction of resistors 95 and 96, whereby the above-described stabilizing means is disabled and fast excitation changes are permitted. The advantages of this temporary disabling function will now be apparent. During a downward transition, as each of the sequentially actuated contacts C1 and C2 is opened in turn, the excitation means responds to the sudden decrement of output power of the alternator by increasing the duty cycle of the field switch Q4, thereby raising the level of field excitation and correspondingly increasing the amplitudes of the voltages generated in each set of alternator armature windings. By opening the contact 51b during this downward transition, the stabilizing means is not able to limit the rate of increase of the excitation level, and consequently the new voltage (and current) values of the parallelled alternator windings are attained more rapidly than would otherwise be possible. During an upward transition, before the contacts C1 and C2 are closed in turn, the excitation of the alternator field is reduced below normal by operation of the excitation reducing relay 50 (FIG. 2) which opens the contact 50a in series with the shunt field winding 19 of the exciter 17 so that the field 19 is disconnected from the field switch Q4 and field current can decay at its maximum rate. The exciter armature voltage correspondingly decreases, and if the contact 51b were not then open to disable the stabilizing circuit, the charge on the coupling capacitor 108 would significantly change in a sense that would undesirably bias the modulator 90 and thereby impede the excitation control means, upon subsequent reclosure of the contact 50a, from establishing the level of field excitation that is required to attain the new voltage (and current) values of the seriesed alternator windings.

As can be seen in FIG. 5, the contact 50a of the excitation reducing relay 50 (FIG. 2) is connected between the exciter shunt field winding 19 and the field switch Q4. This contact is open whenever the relay 50 is dropped out, as is true during the period that the signal No. 1 (FIGS. 2 and 3) is high following the production of an up transition command signal. Opening the contact 50a interrupts the normal energizing circuit for the shunt field 19, whereby field current can decay at its maximum rate determined by the time constant of the free-wheeling loop comprising resistors 76 and 67 and the field winding itself. As a result, the output voltage of the exciter 17 and hence the excitation level of the alternator field 13 are rapidly reduced below normal.

Concurrently with the opening of contact 50a, the companion contact 50b of the excitation reducing relay 50 closes to connect a resistor 110 in parallel with the resistor 68, thereby reducing the net ohmic value of the resistance in series with the exciter series field winding 18. Current in the series field 18 will now increase, thereby boosting the magnetic field of this winding. Since the series field is wound differently with respect to the shunt field, its boost will augment the reduction of the exciter output voltage. If desired, the contact 50b can be arranged to open in delayed response to closure of the contact 50a.

DESCRIPTION OF AN ALTERNATIVE EMBODIMENT

An alternative embodiment of the transition control means 40 is shown functionally in FIG. 6 which will now be described. As was true in the embodiment shown in FIG. 2 and described above, the rising or positive edge of a high signal on the line 47 coincides with the production of the up transition command signal, and the falling or negative edge of a high signal on this line coincides with the production of the down transition command signal. The line 47 is connected to the first of two inputs of each of three AND logic circuit 121, 122, and 123, and it is also connected to an inverting input of an AND logic circuit 124.

Figure 6:
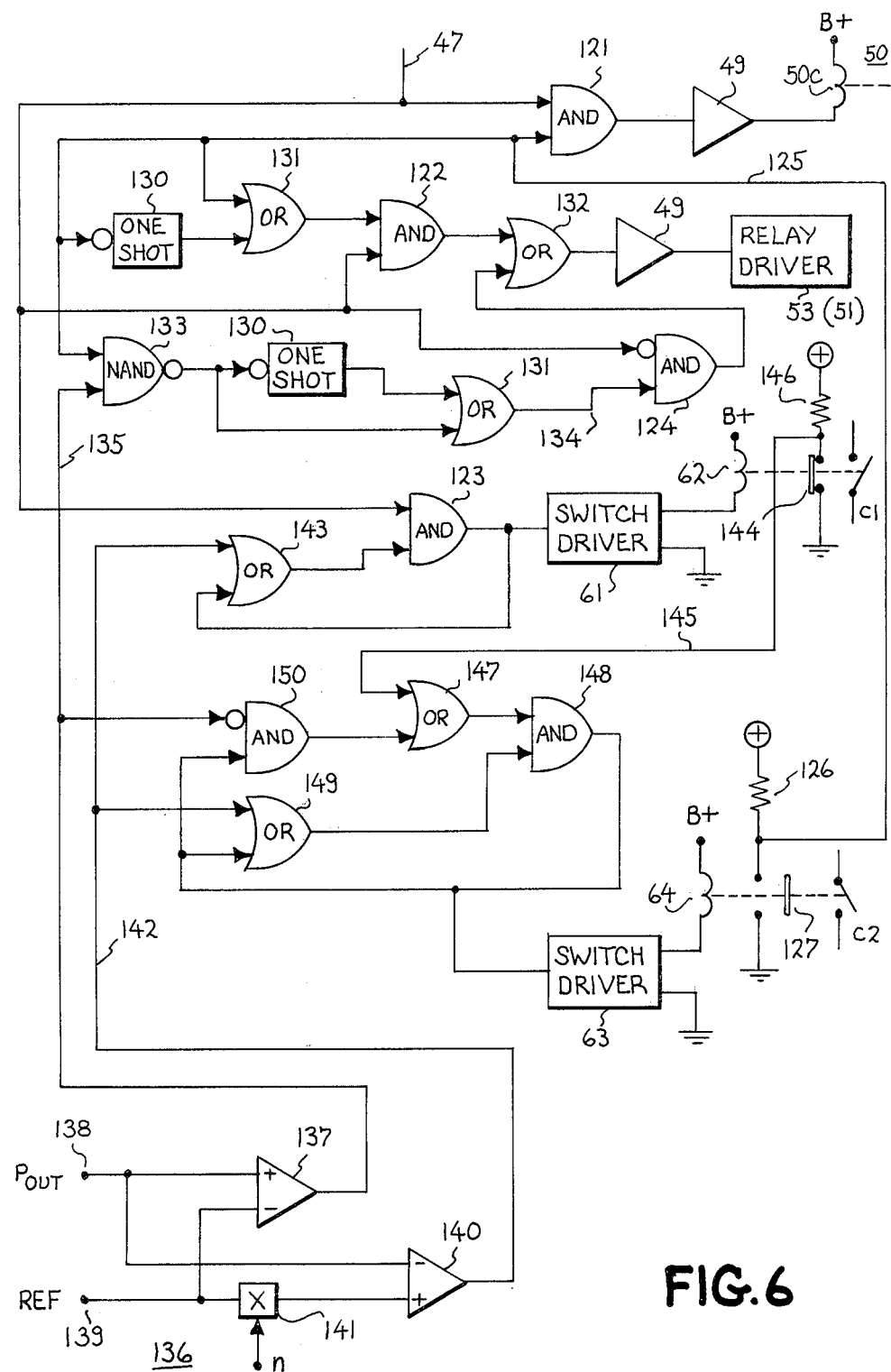
FIG. 6 is a functional block diagram of an alternative embodiment of the transition control means.

As can be seen in FIG. 6, the second input of the AND logic circuit 121 is connected via a line 125 and a resistor 126 to a relatively positive control power terminal, and the line 15 is also connected via a normally open interlock 127 of the second switching means C2 to ground. Thus the signal on the line 125 is high ("1") whenever the contact C2 is in its open circuit state and is low ("0") whenever C2 is closed. The signal at the output of the circuit 121 is therefore high only when C2 is open and a high signal exists on the line 47. This output signal is coupled through a buffer amplifier 49 to the operating coil 50c of the excitation reducing relay 50, and when high it causes this normally picked up relay to drop out. As a result, the excitation of the alternator field 13 (FIG. 1) is reduced below its normal level for a period of time commencing with the production of an up transition command signal and expiring with the subsequent closure of the contact C2. So long as the contact C2 remains closed, the signal on line 125 and the output of the AND circuit 121 are both low, whereby the relay 50 is picked up in which state it is ineffective to reduce alternator field excitation below normal.

The line 125 is also connected to the second input of the AND logic circuit 122 by way of time delay means shown in FIG. 2 as a one-shot device 130 and an OR logic circuit 131. The device 130 produces a high output signal of preselected duration when triggered by a falling edge of a high signal on the line 125. This output signal provides one input at the OR circuit 131 whose other input is the signal on the line 125. The latter signal is high when the second switching means C2 is open. Thus the output signal of the circuit 131 is high so long as C2 is open, and it changes to a low state in delayed response to C2 being actuated from open to closed circuit positions. With high signals at both of its inputs (due to the production of an up transition command signal on the line 47 while contact C2 is open), the AND logic circuit 122 will supply a high signal to a first input of an OR logic circuit 132 whose output is coupled through a buffer amplifier 49 to the normally inactive relay driver 53 which is associated with the previously described disabling relay 51. A high output signal from the circuit 132 will activate the driver 53, thereby causing the relay 51 to open its normally closed contact 51b (see FIGS. 2 and 5) to effect disabling of the excitation stabilizing means. This disabling effect continues for an interval appreciably longer than the time that elapsed from the production of the up transition command signal to the conclusion of the resulting open-to-closed state changing action of the switching means C1, C2, and it is terminated in delayed response to the closure of C2.

The disabling relay driver 53 is also activated in response to the production of a down transition signal. As is shown in FIG. 6, the OR logic circuit 132 has a second input connected to the output of the AND circuit 124. The line 47 is connected to an inverting input of the circuit 124, and the output of a NAND logic circuit 133 is connected to the other input of the AND circuit 124 by way of time delay means 130, 131 (similar to the correspondingly numbered components that were described above) and a line 134. Assuming the signal on line 134 is high (as will be true whenever the second switching means C2 is closed, the AND circuit 124 will respond to a high-to-low signal change on the line 47 (i.e., the production of a down transition command signal) by supplying a high signal to the second input of the OR circuit 132, thereby activating the driver 53 of the disabling relay 51 which in turn responds by disabling the excitation stabilizing means as previously described. The disabling relay driver 53 will return to its normally inactive state when the signal on line 134 subsequently reverts to a low state.

The high or low state of the signal on line 134 depends on the input signals received by the NAND circuit 133. This circuit has two inputs: one is the signal on the line 125 from the interlock 127 of contact C2, and the other is a signal on a line 135 from means 136 for comparing the actual electrical output power of the alternator 12 with the desired level of power. The power comparison means 136, as will soon be explained, is constructed and arranged to produce on the line 135 a high signal whenever actual power equals or exceeds the desired level. The circuit 133 responds to its two input signals by producing an output signal which is high whenever either input signal is low (indicating that the contact C2 is closed or that the actual alternator power is lower than desired, or both) and which is low only when both inputs are high (indicating that C2 has opened and that actual power has been restored to at least its desired level). This output signal is passed by the OR circuit 131 to the input line 134 of the AND circuit 124. Given a high signal on the line 134, the one-shot device 130 will sustain the high state of this signal for a preselected length of time after a high-to-low signal change at the output of the circuit 133. Consequently the relay driver 53, once activated in response to a down transition command signal, continues to effect the disabling function for an internal appreciably longer than the time that elapses from the production of the down command signal to the conclusion of the resulting closed-to-open state changing action of the switching means C1, C2. The disabling effect is terminated in delayed response to restoration of the desired level of power after the downward transition has been concluded by the opening of the contact C2.

The power comparison means 136 preferably comprises a comparing amplifier 137 whose inputs are respectively connected to terminals 138 and 139. The terminal 138 is adapted to be supplied with a signal representative of the actual magnitude of the electrical power output of the alternator 12, i.e., the product of output voltage and current as measured by the voltage and current transducers 22 and 24, respectively (see FIG. 1). The terminal 139 is adapted to be supplied with a signal representative of the desired magnitude of alternator output power that is being called for by the reference circuit 70 (see FIG. 5). If the actual power were lower than desired, the output of the comparer 137 will be low, but whenever actual power is equal to or higher than the desired level of power the comparator 137 produces a high signal on the line 135.

The power comparison means 136 also includes a second comparing amplifier 140 having a minus input connected directly to the power output terminal 138 and a plus input connected through a multiplier 141 to the reference terminal 139. The multiplier 131 multiplies the desired level of power by a predetermined fraction "n" (e.g., 6/10, whereby its output is n times the desired power. Whenever actual power is equal to or lower than this fraction of the desired level of power, the amplifier 140 produces a high signal on an output line 142. The line 142 is connected to a first input of an OR logic circuit 143 whose output is in turn connected to the second input of the AND circuit 123. The output signal of the circuit 123 provides an input to the switch driver 61 that is part of the actuating means for the first contact C1 of the switching means C1, C2, and it is also fed back to the second input of the OR circuit 143. With this arrangement, the open-to-closed state changing action of the contact C1 is not initiated, after a 0-to-1 signal change on the line 47 (i.e., an up transition command signal), until the actual power output of the alternator has decreased to a level below the aforesaid fraction of the desired level of power, as indicated by the production of a high signal on the line 142. Subsequently, in immediate response to a 1-to-0 signal change on the line 47 (i.e., a down transition command signal) the output of the AND circuit 123 will go low and the switch driver 61 will deenergize that operating coil 62 which allows C1 to open.

Closing the first switching means C1 causes an associated normally closed interlocked 144 to open. As is shown in FIG. 6, the interlock 144 is connected between a line 145 and ground, and this line is also connected via a resistor 146 to a relatively positive control power terminal. Thus the signal on the line 145 is low ("0") whenever the contact C1 is in its open circuit state and is high ("1") whenever C1 is closed. This signal is supplied to a first input of an OR logic circuit 147 whose output is connected to the first of two inputs of an AND logic circuit 148. The output signal of the latter circuit provides an input to the switch driver 63 that is part of the actuating means for the second contact C2 of the switching means. The second input of the AND circuit 148 is provided by the output signal of an OR logic circuit 149 having a first input connected to the line 142 and a second input connected to the output of the circuit 148. With this arrangement, the open-to-closed state changing action of the second contact C2 is not initiated until the alternator output power has decreased to a level below the aforesaid fraction of the desired level of power (as indicated by the production of a high signal on the line 142) while the first contact C1 is closed (as indicated by a high signal on the line 145).

The actuating means for the second switching means C2 also includes an AND logic circuit 150 having an inverting input to which the line 135 is connected and a second input to which the output of the AND circuit 148 is connected. The output signal of the circuit 150 is high only when there is a high signal at the output of the circuit 148 and not a high signal on the line 135 (indicating that the alternator output power is lower than desired). A high output signal from the circuit 150 is passed by the OR circuit 147 to the first input of the circuit 148, and during a downward transition it ensures that the closed-to-open state changing action of the second contact C2 is not initiated, after the first contact C1 opens, until the desired level of alternator output power has been restored. As soon as the power output actually attains its desired level, the comparing amplifier 137 produces a high signal on the line 135, the output signals of the AND circuits 150 and 148 go low, and the switch driver 63 will deenergize the operating coil 62 which allows C2 to open.

It will now be apparent that the alternative embodiment of the transition control means shown in FIG. 6 accomplishes the desired sequential or staggered closing (or opening) operations of the contacts C1 and C2 in response to the production of an up (or down) transition command signal. During an upward transition the operation of this embodiment differs from that of the first embodiment shown in FIG. 2 in that the delayed closure of the first contact C1 and the further interval of time that elapses before initiating closure of the second contact C2 are determined not by preselected fixed timers but rather by the times required to decrease the power output of the alternator, which is now running with reduced excitation, to a predetermined fraction of a desired or reference level thereof. During a downward transition, the FIG. 6 embodiment similarly differs from the FIG. 2 embodiment in that the delay between initiating the respective openings of the two contacts C1 and C2 is not a predetermined fixed interval but rather depends on the time required to restore the desired level of alternator output power after the contact C1 closes.

While alternative forms of the invention have been herein shown and described by way of illustration, other modifications and variations therein will probably occur to persons skilled in the art. It is therefore intended by the concluding claims to cover all such changes and modifications as fall within the true spirit and scope of this invention.

I claim:
1. In combination:
    (a) a pair of d-c buses;
    (b) a plurality of d-c traction motors connected in parallel with one another between said buses;
    (c) rectifying means having three legs interconnected in parallel circuit relationship between said buses, each of said legs comprising first, second, third, and fourth unilaterally conducting devices connected in series with one another and polled to conduct current in a direction from one of said buses to the other;
    (d) a traction alternator having a field winding and first and second separate sets of armature windings, each of said sets comprising three windings interconnected in a 3-phase star configuration and so arranged that the alternating voltages generated in the respective windings of said first set will be substantially in phase with the alternating voltages generated in the corresponding windings of said second set;
    (e) means for connecting the windings of said first set to the respective legs of said rectifying means at points between the first and second devices thereof and for correspondingly connecting the windings of said second set to the respective legs of said rectifying means at points between the third and fourth devices thereof, whereby said first and second sets of windings are effectively connected in parallel between said buses;
    (f) first and second switching means respectively connected between the juncture of the second and third devices in one of said legs and the corresponding junctures of the second and third devices in the other legs of said rectifying means, each of said switching means having an open circuit state and a closed circuit state, said first and second sets of windings being effectively connected in series between said buses when both of said switching means are in their closed circuit states;
    (g) means for producing alternative up and down transition command signals; and

(h) means for actuating said switching means between said open and closed circuit states, said actuating means being operative in response to the production of said up transition command signal for causing said first and second switching means to close in sequence and being operative in response to the production of said down transition command signal for causing said first and second switching means to open in sequence.

2. The combination as set forth in claim 1 wherein said actuating means includes means for delaying its operation so that the open-to-closed state changing action of one of said switching means is initiated a predetermined interval of time after the corresponding action of the other switching means has been initiated in response to said up transition command signal and so that the closed-to-open state changing action of one of said switching means is initiated a predetermined interval of time after the corresponding action of the other switching means has been initiated in response to said down transition command signal.

3. The combination as set forth in claim 1 wherein said actuating means includes means responsive to the actual electrical output power of said alternator for producing a first signal indicating that said actual power is higher than a desired level of power and for producing a second signal indicating that said actual power is lower than a predetermined fraction of said desired level of power, said actuating means being arranged to initiate the open-to-closed state changing action of one of said switching means upon the production of said second signal after the corresponding action of the other switching means has been initiated in response to said up transition command signal and being arranged to initiate the closed-to-open state changing action of one of said switching means upon the production of said first signal after the corresponding action of the other switching means has been initiated in response to said down transition command signal.

4. The combination as set forth in claim 1 and further including
  (a) excitation means of variably exciting said field winding so as to control the electrical output of said alternator, the normal level of field excitation being varied as necessary to prevent the actual values of selected electrical output parameters of the alternator from respectively exceeding desired limits thereof, and
  (b) means connected to said excitation means for temporarily reducing said field excitation below said normal level upon the production of said up transition command signal.

5. The combination as set forth in claim 4 wherein said actuating means includes means for delaying its operation so that the open-to-closed state changing action of said first switching means is initiated in delayed response to said up transition command signal and the corresponding action of said second switching means is initiated a predetermined interval of time thereafter and so that the closed-to-open state changing action of one of said switching means is initiated a predetermined interval of time after the corresponding action of the other switching means has been initiated in response to said down transition command signal.

6. The combination as set forth in claims 4 or 5 wherein said excitation means includes normally enabled stabilizing means responsive to the rate of change of said excitation level for affecting operation of said excitation means in a rate limiting manner, and wherein means is provided for temporarily disabling said stabilizing means upon the production of either said up or said down transition command signal.

7. The combination as set forth in claim 6 wherein said disabling means is effective to disable said stabilizing means for an interval longer than the time that elapses from the production of said up transition command signal to the end of the open-to-closed state changing actions of both of said switching means and for an interval longer than the time that elapses from the production of said down transition command signal to the end of the closed-to-open state changing actions of both of said switching means.

8. The combination as set forth in claim 4 wherein said actuating means includes means responsive to the actual output power of said alternator for producing a first signal indicating that said actual power is higher than a desired level of power and for producing a second signal indicating that said actual power is lower than a predetermined fraction of said desired level of power, said actuating means being arranged to initiate the open-to-closed state changing action of said first switching means upon the production of said second signal after said up transition command signal has been produced and to initiate the corresponding action of said second switching means upon production of said second signal while said first switching means is closed, said actuating means also being arranged to initiate the closed-to-open state changing action of one of said switching means upon production of said first signal after the corresponding action of the other switching means has been initiated in response to said down transition command signal.

9. The combination as set forth in claim 8 wherein said excitation reducing means is ineffective to reduce said field excitation below normal whenever said second switching means is closed.

10. The combination as set forth in claim 8 wherein said excitation means includes normally enabled stabilizing means responsive to the rate of change of said excitation level for affecting operation of said excitation means in a rate limiting manner, and normally inactive means for disabling said stabilizing means when active, said disabling means being temporarily activated in response to the production of either said up or said down transition signal.

11. The combination as set forth in claim 10 wherein said disabling means is effective, once activated in response to said up transition command signal, to disable said stabilizing means for an interval of time that is terminated in delayed response to closure of said second switching means, said disabling means also being effective, once activated in response to said down transition command signal, to disable said stabilizing means for an interval of time that is terminated in delayed response to production of said first signal while said second switching means is open.

12. The combination as set forth in claim 1 wherein said up and down transition command signals are produced by means responsive to the rotational speeds of said motors said up signal being initially produced as motor speed increases above a predetermined first threshold and said down signal being initially produced as motor speed decreases below a second threshold which is lower than said first threshold.

* * * * *